(12) United States Patent
Patel et al.

(10) Patent No.: US 8,014,834 B2
(45) Date of Patent: Sep. 6, 2011

(54) SYSTEM AND METHOD TO CONDUCT IDLE MODE PAGING CHANNEL MONITORING WITHIN A CELLULAR WIRELESS NETWORK

(75) Inventors: Ronish Patel, East Windsor, NJ (US); Nelson R. Sollenberger, Farmingdale, NJ (US)

(73) Assignee: Broadcom Corporation, Irvine, CA (US)

( * ) Notice: Subject to any disclaimer, the term of this patent is extended or adjusted under 35 U.S.C. 154(b) by 652 days.

(21) Appl. No.: 12/048,326

(22) Filed: Mar. 14, 2008

(65) Prior Publication Data

US 2008/0161022 A1 Jul. 3, 2008

Related U.S. Application Data

(63) Continuation of application No. 11/494,423, filed on Jul. 27, 2006, now Pat. No. 7,395,099, which is a continuation of application No. 10/749,661, filed on Dec. 31, 2003, now Pat. No. 7,107,080, and a continuation of application No. 10/749,492, filed on Dec. 31, 2003, now Pat. No. 7,342,956.

(60) Provisional application No. 60/478,922, filed on Jun. 16, 2003.

(51) Int. Cl.
*H04M 1/00* (2006.01)

(52) U.S. Cl. ..................... 455/574; 455/458; 455/418

(58) Field of Classification Search .................. 455/574, 455/458, 418
See application file for complete search history.

(56) References Cited

U.S. PATENT DOCUMENTS 7,031,374 B1 * 4/2006 McDonough ................. 375/148

FOREIGN PATENT DOCUMENTS

| WO | WO 97/20446 | 6/1997 |
| WO | WO 01/76295 | 10/2001 |

* cited by examiner

*Primary Examiner* — Nghi H Ly
(74) *Attorney, Agent, or Firm* — Garlick Harrison & Markison

(57) ABSTRACT

A method and system to determine when a wireless terminal has been paged by a servicing base station. An encoded paging burst is received on a paging channel and then decoded to produce a decoded paging burst. The decoded paging burst is processed to determine if it is a null page. When the encoded paging burst is a null page, it is processed to produce a null page pattern. The wireless terminal may then enter a sleep mode or reduced functionality mode for a predetermined period of time. The wireless terminal awakes from the sleep mode to receive additional encoded paging bursts. Processing the additional encoded paging bursts produces a processed encoded paging burst, which is compared to the null page pattern. When compared favorably, the encoded paging burst is considered a null page, allowing the wireless terminal to re-enter the sleep mode without fully decoding the paging burst.

16 Claims, 7 Drawing Sheets

SYSTEM AND METHOD TO CONDUCT IDLE MODE PAGING CHANNEL MONITORING WITHIN A CELLULAR WIRELESS NETWORK

CROSS REFERENCES TO RELATED APPLICATIONS

This patent application is a continuation of and claims priority to U.S. patent application entitled SYSTEM AND METHOD TO CONDUCT IDLE MODE PAGING CHANNEL MONITORING WITHIN A CELLULAR WIRELESS NETWORK, having an application Ser. No. 11/494,423 and a filing date of Jul. 27, 2006; which application is a continuation application of U.S. patent application entitled SYSTEM AND METHOD TO CONDUCT IDLE MODE PAGING CHANNEL MONITORING WITHIN A CELLULAR WIRELESS NETWORK, having an application Ser. No. 10/749,661 and a filing date of Dec. 31, 2003, now U.S. Pat. No. 7,107,080; as well as a continuation application of U.S. patent application entitled SYSTEM AND METHOD TO EXTRACT UPLINK STATUS FLAG BITS IN A CELLULAR WIRELESS NETWORK, having an application Ser. No. 10/749,492 and a filing date of Dec. 31, 2003, now U.S. Pat. No. 7,342,956; which are all incorporated herein by reference for all purposes.

The 10/749,661 and 10/749,492 patent applications also claim priority to U.S. Provisional Application having a provisional application No. 60/478,922, filed Jun. 16, 2003; which is also incorporated herein by reference for all purposes.

BACKGROUND

1. Technical Field

The present invention relates generally to cellular wireless communication systems; and more particularly to the determining when a servicing base station has paged a wireless terminal.

2. Related Art

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. In GSM, wireless terminals are informed of the need to service incoming communications via pages from base stations to the wireless terminals. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

To conserve power, the wireless terminal may sleep when not actively communicating with a servicing base station. However, to ensure no communications are missed, the wireless terminal awakens periodically to receive a page burst that indicates if the wireless terminal must service a communication from the servicing base station. To make this determination, the wireless terminal typically expends significant battery power and processing resources to decode the page burst and to determine whether the wireless terminal was paged. Thus, there exists a need for wireless terminals that can quickly and efficiently identify whether it has been paged without unnecessarily consuming the resources of the wireless terminal.

BRIEF SUMMARY OF THE INVENTION

The present invention provides a method and system to determine when a wireless terminal has been paged by a servicing base station that substantially meets the above-described needs among others. The method begins with an encoded paging burst being received on a paging channel and then decoded to produce a decoded paging burst. The decoded paging burst is processed to determine if it is a null page. When the encoded paging burst is a null page, it is processed to produce a null page pattern. The wireless terminal may then enter a sleep mode or reduced functionality mode for a predetermined period of time. The wireless terminal awakes from the sleep mode to receive additional encoded paging bursts. Processing the additional encoded paging bursts produces a processed encoded paging burst, which is compared to the null page pattern. When compared favorably, the encoded paging burst is considered a null page, allowing the wireless terminal to re-enter the sleep mode without fully decoding the paging burst. However, when the comparison is unfavorable it may be necessary to fully decode the encoded paging burst.

In additional embodiments, the null page pattern as well as the processed encoded paging bursts, are made up of a set of soft decisions. Each soft decision of the null page pattern corresponds to a soft decision that is within the process encoded paging bursts. This allows a one-to-one comparison to produce a set of comparisons between the encoded paging burst and the null page pattern. If the number of favorable comparisons exceeds a comparison threshold, the wireless terminal may then act as if the paging burst is a null page. Similarly, if the number of comparisons does not exceed a comparison threshold, the comparison is unfavorable in which case the wireless terminal acts as if it had been paged. Additionally, processing the encoded paging burst may involve equalizing to produce a proper set of soft decision bits.

Another embodiment provides a wireless terminal that performs these operations. This wireless terminal has a Radio Frequency (RF) front-end, a baseband processor operably coupled to the RF front-end, and an enCOding/DECoding (CODEC) processing module operably coupled to the baseband processor. During a first time interval the RF front-end, baseband processor, and CODEC processing module operate in combination to receive an encoded paging burst on a paging channel. The combination or its elements then decodes the encoded paging burst to produce a decoded paging burst. It is determined whether or not the decoded paging burst contains a null page for the wireless terminal. The null page is further processed to produce a null page pattern, which may be stored for future comparisons. Additionally, at the end of the first time period when the decoded paging burst corresponds to a null page for the wireless terminal, the wireless terminal enters a sleep mode for a sleep period. During a second period of time, the RF front-end, baseband processor, and CODEC processing module awaken from the sleep mode at the expiration of the sleep mode period to receive additional encoded paging bursts. These additional encoded paging bursts are processed by the RF front-end, baseband processor, and CODEC processing module to produce a processed encoded paging burst. Then, these elements compare the processed encoded paging bursts to the null page pattern. When the comparison is favorable, one can consider the additional encoded burst to be a null page.

Another embodiment of the present invention also provides a wireless terminal. This wireless terminal has a RF front-end operatively coupled to a baseband processor. These elements take on the function of the previously identified CODEC processing module. The RF front-end and the baseband processor operate to receive an encoded paging burst on a paging channel and decode that encoded paging burst to produce a decoded paging burst. The decoded paging burst is further processed to determine if the decoded paging burst contains a null page for the wireless terminal. When the decoded paging burst contains a null page for the wireless terminal the encoded paging burst is processed to produce a null page pattern. After this processing, the baseband processor and RF front-end direct the wireless terminal to enter a sleep mode for a sleep period of time. At the expiration of a sleep mode period, the RF front-end and the baseband processor awaken from the sleep mode to receive an additional encoded paging burst. This paging burst is processed to produce a processed encoded paging burst. The processed encoded paging burst may be compared to the null page pattern and when the comparison is favorable determine that the additional encoded paging burst is a null page. In the instance where the additional encoded paging burst is a null page, the RF front-end and baseband processor direct the wireless terminal to re-enter the sleep mode upon the favorable comparison. However, when the comparison is unfavorable the baseband processor operates to decode the processed encoded paging burst.

Other features and advantages of the present invention will become apparent from the following detailed description of the invention made with reference to the accompanying drawings.

DETAILED DESCRIPTION OF THE DRAWINGS

Figure 1:
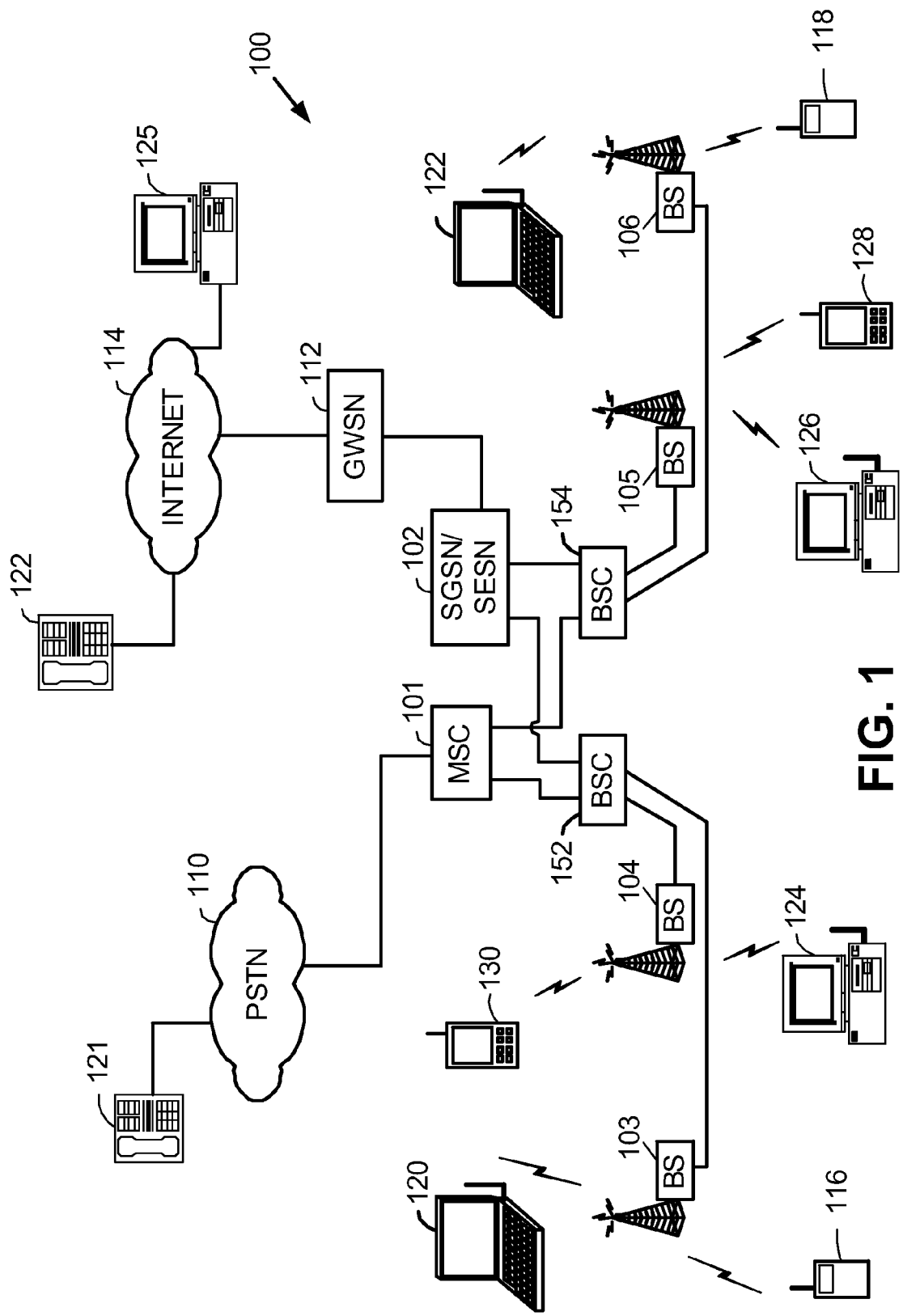
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 1110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that combine Automatic Repeat ReQuest (ARQ) operations at Layer 2, e.g., LINK/MAC layer with variable coding/decoding operations at Layer 1 (PHY).

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

Figure 2:
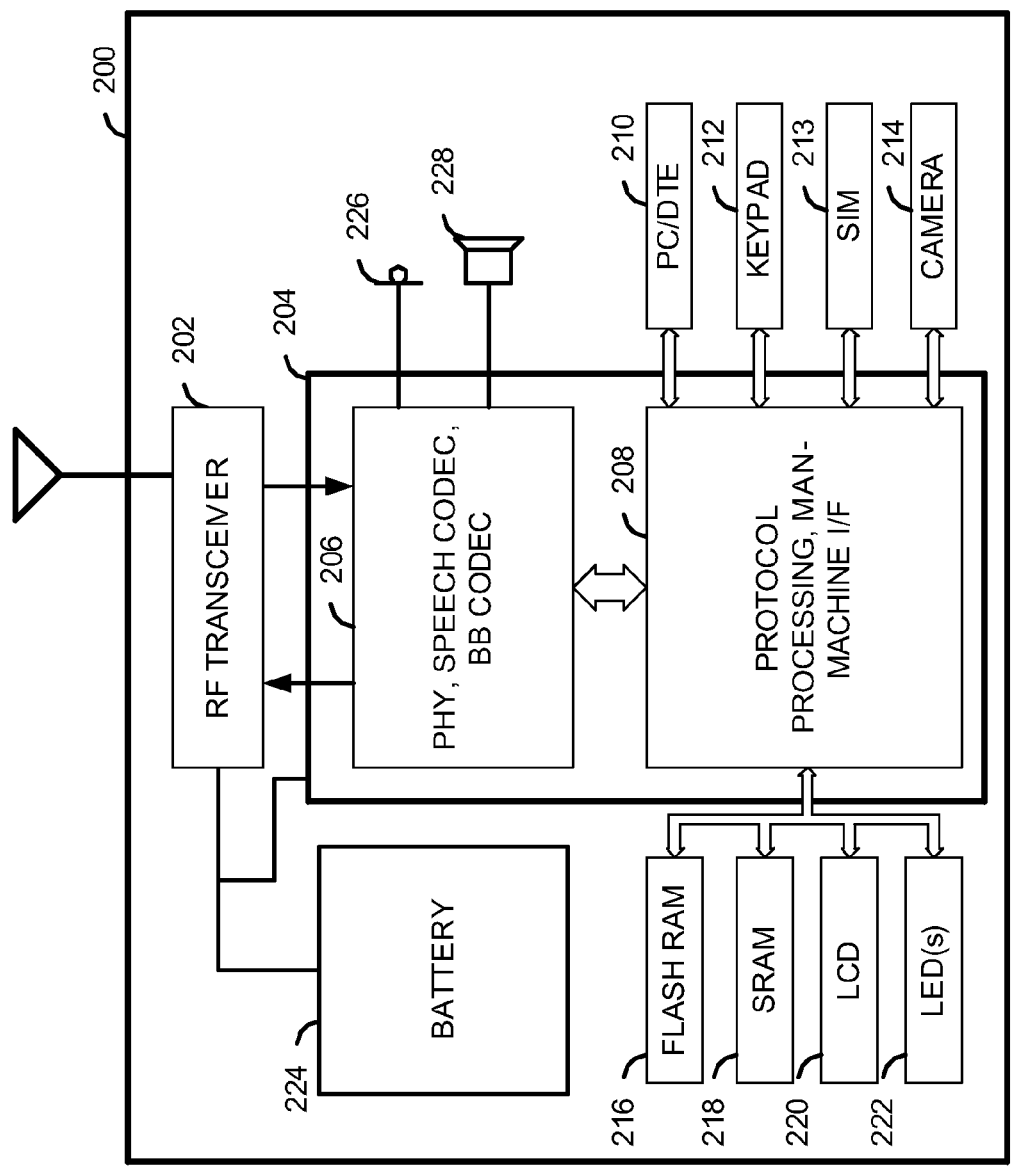
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a housing. The digital processing components 204 includes two main functional components, a physical layer processing, speech COder/DECoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
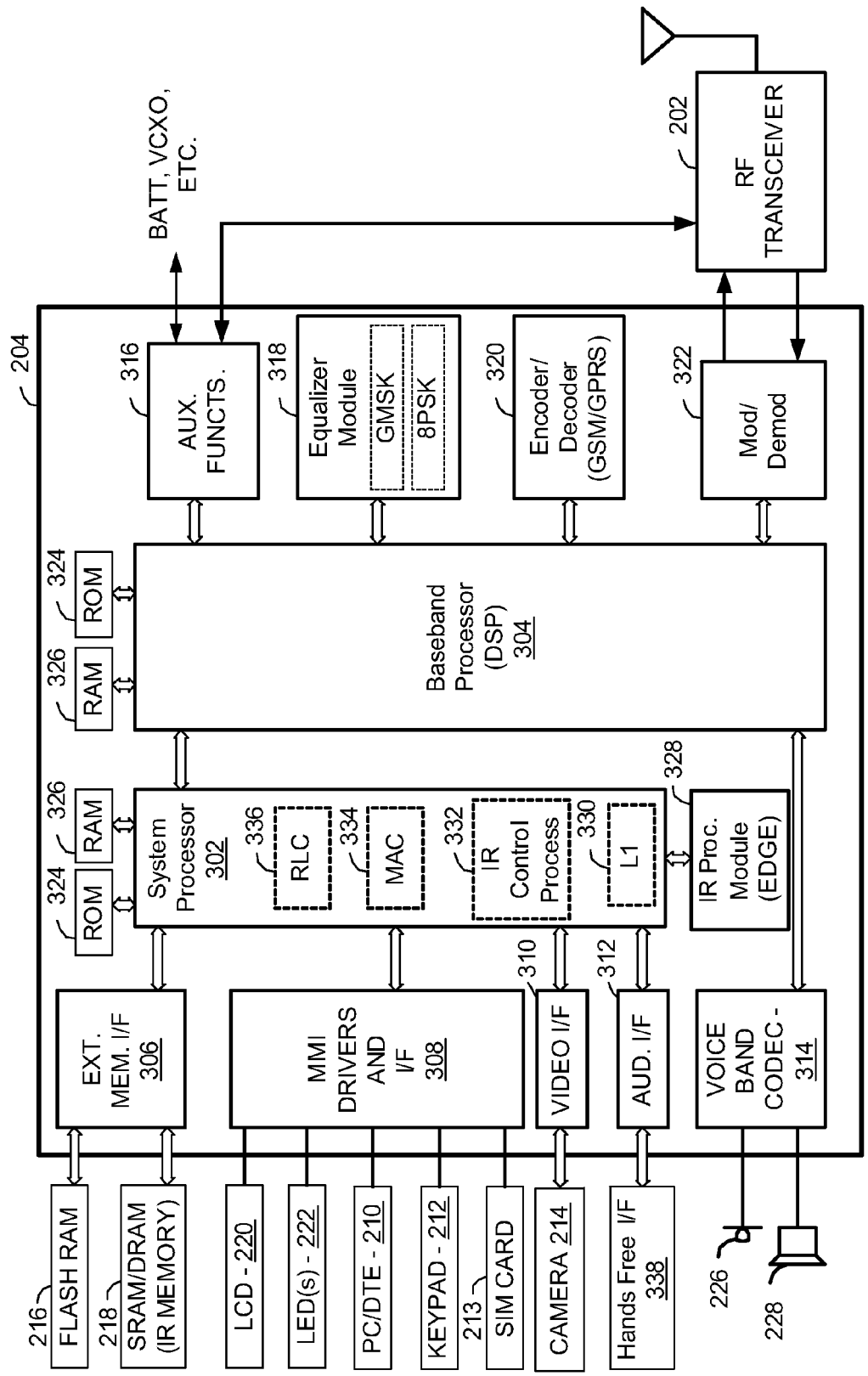
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a video I/F 310, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an encoder/decoder module 320, and an Incremental Redundancy (IR) processing module 328. The interconnections of FIG. 3 are one example of a manner in which these components may be interconnected. Other embodiments support additional/alternate couplings. Such coupling may be direct, indirect, and/or may be via one or more intermediary components.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 coupled to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. In particular the system processor 302 services Layer 1 (L1) operations 330, a portion of Incremental Redundancy (IR) GSM protocol stack operations 332 (referred to as "IR control process"), Medium Access Control (MAC) operations 334, and Radio Link Control (RLC) operations 336. The baseband processor 304 in combination with the modulator/demodulator 322, RF transceiver, equalizer module 318, and/or encoder/decoder module 320 service the Physical Layer (PHY) operations performed by the digital processing components 204.

Figure 4A:
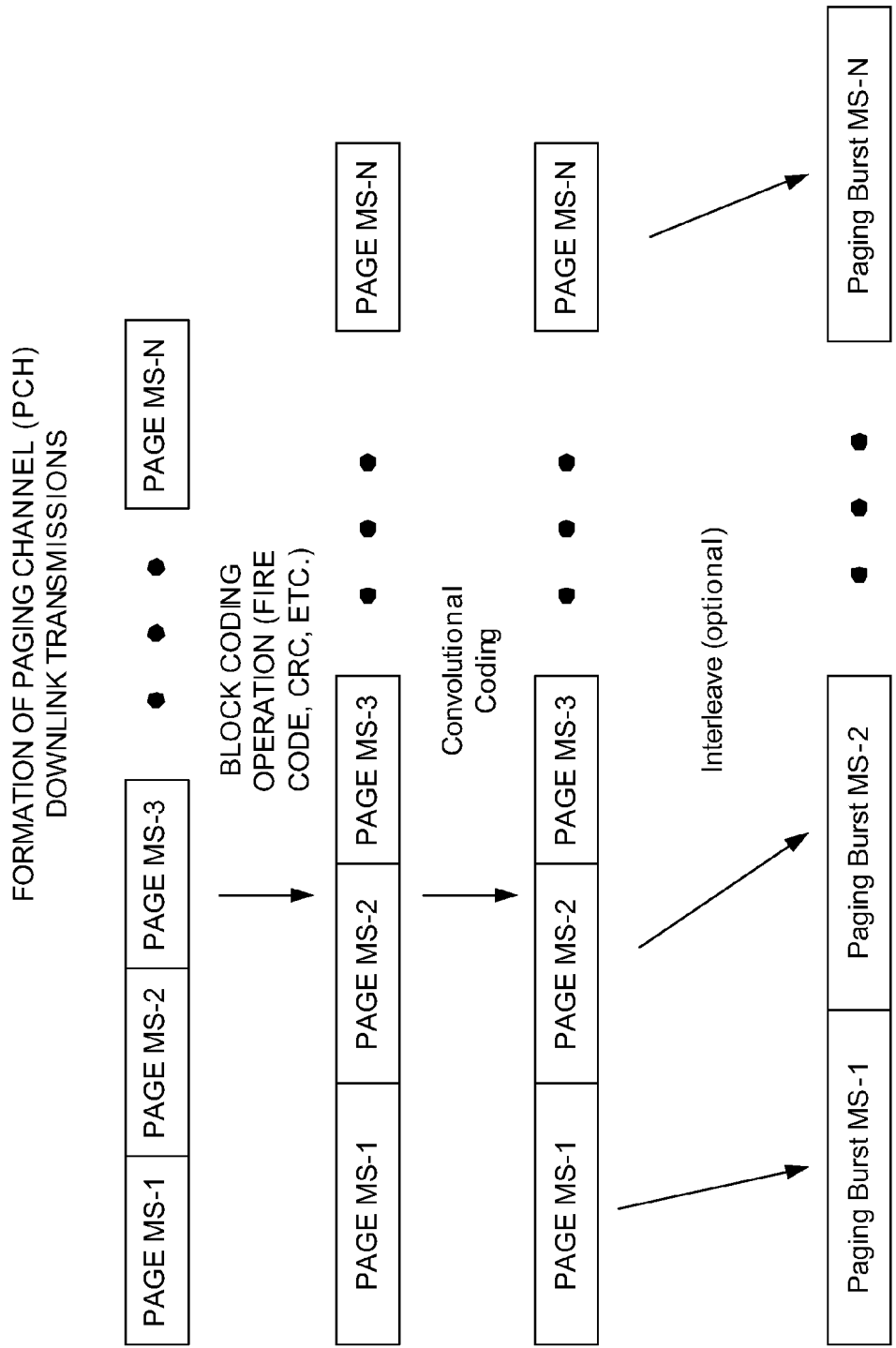
FIG. 4A is a block diagram illustrating the formation of paging channel downlink transmissions.

FIG. 4A depicts the various stages associated with forming and interpreting paging channel (PCH) downlink transmissions. The original pages for the individual wireless terminals or mobile stations are initially divided into a series of pages to be transmitted according to a predetermined schedule to the wireless terminals. This predetermined schedule allows the individual wireless terminals, when not actively transmitting, to enter a sleep mode and merely awaken when it is necessary to receive their respective page bursts. As shown here, the original page undergoes two stages of encoding. First, the original pages undergo a block coding operation that is typically referred to as outer encoding. The block coding stage, allows for the detection of errors within the data block. In addition, the Data blocks may be supplemented with tail bits or block code sequence. Since Block Coding is the first or external stage of channel coding, the block code is also known as an external or outer encoding scheme. Typically, two kinds of codes are used, a cyclic redundancy check (CRC) or a Fire Code. The Fire Codes allow for either error correction or error detection. Error detection with the Fire Code, verifies connectivity.

Next, the pages undergo a second level of encoding that typically is a convolutional coding referred to as inner encoding. The pages may be optionally interleaved to form paging bursts. These paging bursts are what the wireless terminal receives according to the predetermined schedule.

Figure 4B:
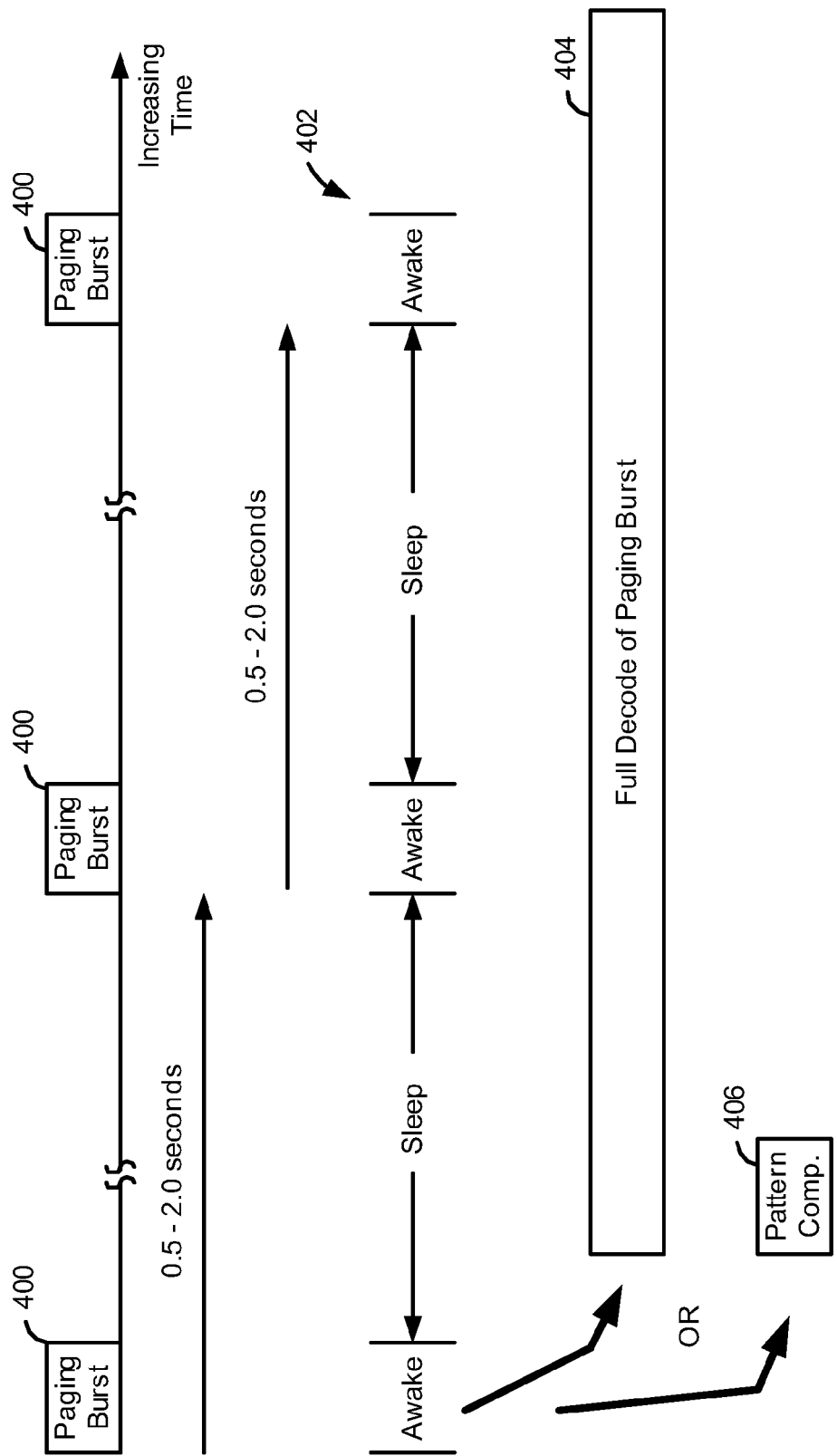
FIG. 4B is a timeline illustrating the receipt and decoding of paging bursts particularly comparing full decoding to partial decoding according to the present invention.

FIG. 4B is a timeline illustrating the receipt and decoding of paging bursts particularly comparing full decoding to partial decoding according to the present invention. Illustrated in FIG. 4B are a series of paging bursts 400 that are received according to paging groups received approximately every 0.5 to 2.0 seconds. The paging bursts carry either a page or a null page for each wireless terminal assigned to a corresponding paging group. When carrying a page, the paging burst 400 signal the wireless terminal to respond to the servicing base station. This may involve servicing a voice call, data or text. When the paging burst 400 is sent, individual wireless terminals that are assigned to the paging group awaken for a period of time indicated by the awake portion of timeline 402 to receive the paging burst.

Typically, 4 paging bursts makeup every paging message and traditionally all 4 paging bursts need to be received before decoding can begin. By making use of the Null page template a sufficiently reliable indication of whether or not the paging message contains any useful information for the mobile can be obtained from only the 1st paging burst of the 4 paging bursts without waiting the 4 paging bursts. If after receiving the 1st paging burst and performing the null pattern match the result is inconclusive then the 2nd paging burst can be received and tested for conformity to the null paging message, and so on until all 4 bursts have been received. As one can appreciate, each paging burst which does not have to be received over the air-interface provides measurable and useful power consumption benefits. If all 4 paging bursts of the block are received and decoded, this constitutes normal paging message reception/decoding. The benefits result from reducing the time that the radio (RF) portion of the receiver is employed (receiving 1 or 2 bursts instead of 4 bursts) and bypassing a large amount of unnecessary baseband message decoding and further processing to understand the contents of the message.

Timeline 402 shows that the wireless terminal's processors are either awake or asleep. When the wireless terminal awakens it may fully decode the paging burst. Alternatively, according to the present invention, when there is a favorable pattern comparison between the paging burst and a null page pattern, the wireless terminal determines that the paging burst is a null page. However, one should note that a null page might be required to be fully decoded. Time segments 404 and 406 show that the time required to fully decode the paging burst is much greater than that required to merely perform a pattern comparison on the processed paging burst with an existing pattern. Therefore one can appreciate that the wireless terminal will remain awake much longer when a full decode of the paging burst is required. This means that additional power will be consumed and processing resources will be utilized to fully decode the paging burst when compared to merely conducting a pattern comparison as indicated in block 406.

Figure 5:
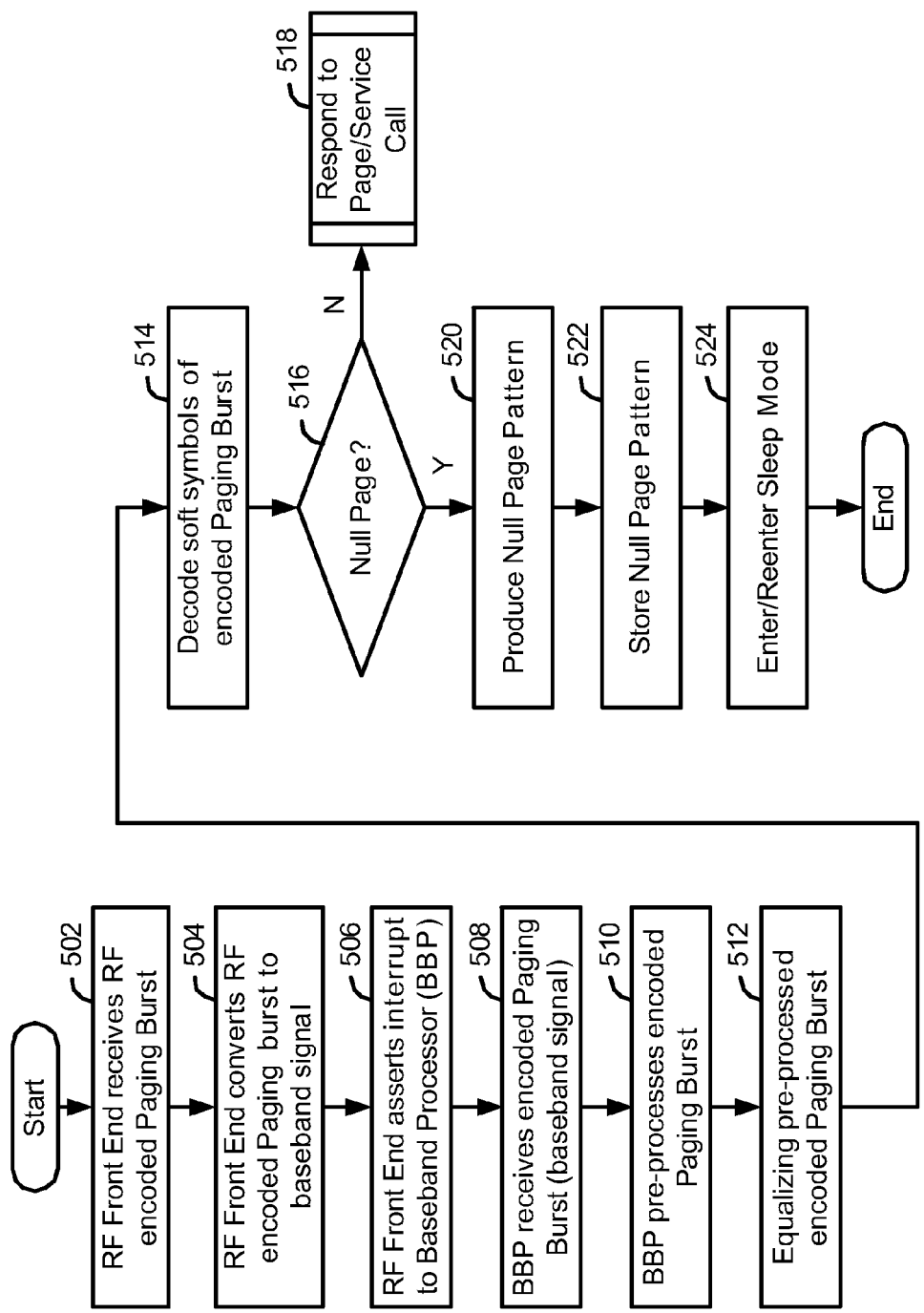
FIG. 5 is a flow chart illustrating operation of a wireless terminal in receiving and processing a paging burst according to the present invention.

FIG. 5 is a flow chart illustrating operation of a wireless terminal in receiving and processing a paging burst according to the present invention. The RF front end receives an encoded paging burst in step 502. The RF front end then converts the encoded paging burst into a baseband signal for the baseband processor in step 504. In step 506, the RF front end then asserts an interrupt to the baseband processor that causes the baseband processor to receive and begin processing the baseband signal containing the paging burst at step 508. The baseband processor pre-processes the encoded paging bursts in Step 510 and equalizes the pre-processed encoded paging bursts in Step 512 to produce soft decisions. Alternately, the equalizer module 318 equalizes the pre-processed encoded paging burst and interrupts the baseband processor to indicate that the equalizer operations are complete for the paging burst. In this case, the baseband processor receives the soft decisions from the equalizer module.

At Step 514 soft symbols of the encoded paging bursts are decoded. This decoding may be performed by the baseband processor 304 or the Encoder/Decoder module 320. The decoding of step 514 corresponds to the coding operations performed by the servicing base station in creating the paging burst. The decoded paging burst is evaluated at decision point 516 to whether or not the page is a null page. If the paging burst is not a null page, in Step 518 the wireless terminal responds to the page, which may include servicing a call.

If the page is a null page a null page pattern is produced at step 520. The null page pattern may simply be the soft decisions that were produced at step 512. Alternately, the soft decisions produced at step 512 may be further processed to produce the null page pattern. One technique for doing this processing involves concatenating the soft decisions into hard decisions and using the hard decisions as the null page pattern. Still another technique for determining the null page pattern is to re-encode the decoded null page produced at step 514 to produce the null page pattern. Using this technique, the encoding scheme(s) that is used by the base station to encode paging bursts must be known and used. The null page pattern is then stored in memory at step 522. The wireless terminal may then re-enter the sleep mode for a predetermined period of time step 524.

Figure 6:
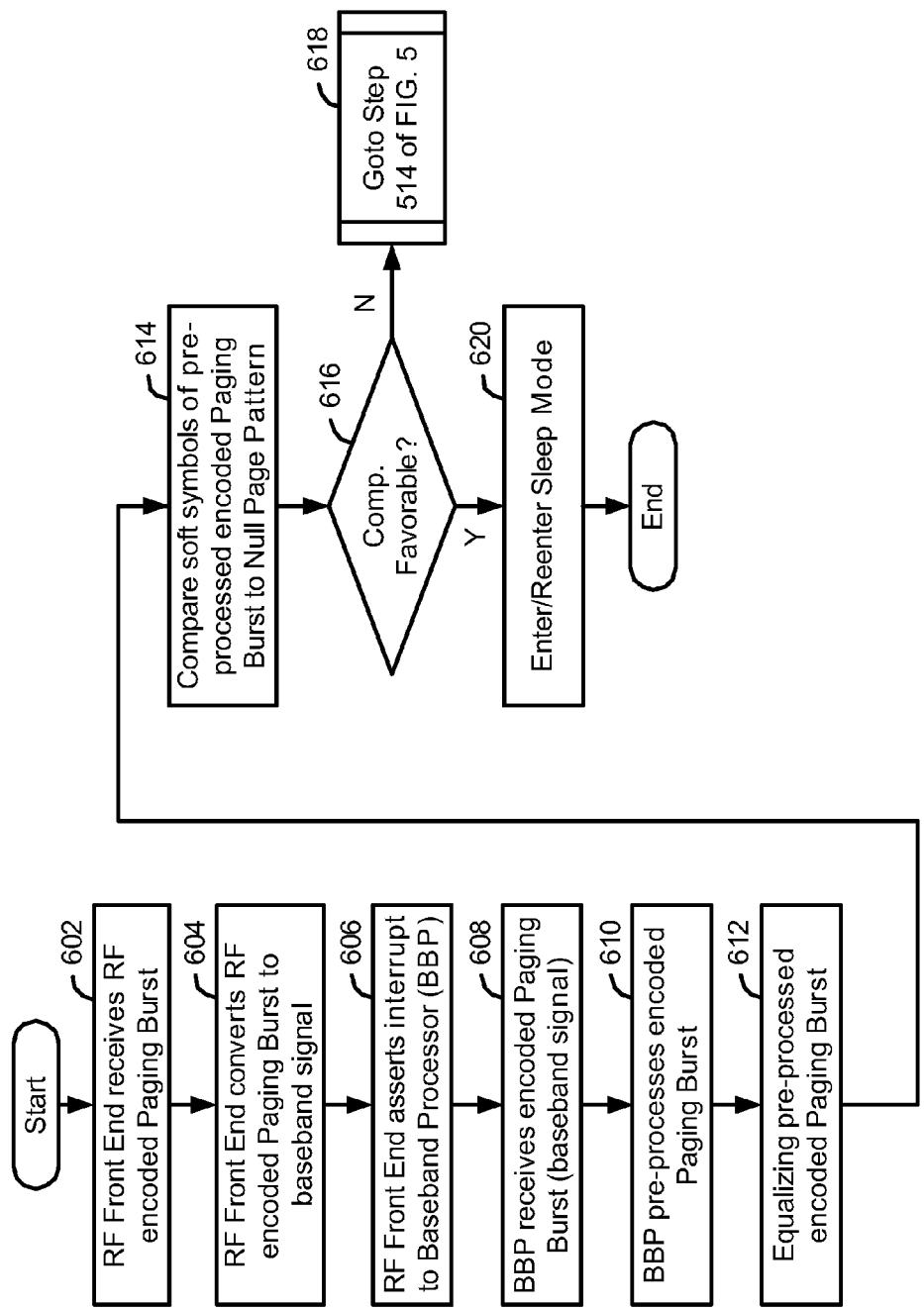
FIG. 6 is a flow chart illustrating subsequent operations of the wireless terminal of FIG. 5 in receiving and processing a subsequent paging burst according to the present invention.

FIG. 6 is a flow chart illustrating subsequent operations of the wireless terminal of FIG. 5 in receiving and processing a subsequent paging burst according to the present invention. In FIG. 6, the RF front end receives an encoded paging burst in Step 602, which the RF front end then converts to a baseband signal in Step 604. An interrupt for the baseband processor is issued in Step 606 in order to have the baseband processor receive and process the baseband signal in Step 608. Steps 610 and 612 indicate preprocessing of the paging bursts and equalizing the pre-processed encoded paging burst. In Step 614 soft symbols of the pre-processed encoded paging bursts are compared to a null page pattern. The null page pattern stored at step 522 of FIG. 5 is compared to the soft symbols of the pre-processed encoded paging bursts.

When the comparison at decision point 616 is favorable, the wireless terminal enters or re-enters a sleep mode at Step 620 because the wireless terminal considers the paging burst to be a null page. When the comparison at decision point 616 is not favorable it becomes necessary to fully decode the soft symbols of the encoded paging bursts and then respond to the page or service call. These steps are achieved by returning to Step 514 of FIG. 5.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method comprising:
receiving an encoded paging burst on a paging channel for a wireless device;
processing the encoded paging burst to obtain a plurality of soft symbols; and
comparing the plurality of soft symbols to previously stored soft decisions of a null page pattern to determine if the wireless device is to enter a reduced functionality mode.

2. The method of claim 1, wherein the reduced functionality mode is a sleep mode.

3. The method of claim 1, wherein the reduced functionality mode is a sleep mode and if the comparing of the plurality of soft symbols to the previously stored soft decisions results in a threshold certainty, then the wireless device enters the sleep mode without further decoding the soft symbols.

4. The method of claim 1, wherein the reduced functionality mode is a sleep mode and if the comparing of the plurality of soft symbols to the previously stored soft decisions results in a threshold certainty, then the wireless device re-enters the sleep mode without further decoding the soft symbols.

5. The method of claim 1, further comprising receiving an earlier encoded null page paging burst, decoding the null page paging burst to identify a null page, obtaining soft decisions of the null page and storing soft decisions as the null page pattern.

6. The method of claim 1, further comprising awakening from an initial sleep mode to receive the encoded paging burst.

7. The method of claim 6, wherein if the comparing of the plurality of soft symbols to the previously stored soft decisions does not result in a threshold certainty, then the wireless device remains in an awake mode to decode the encoded paging burst.

8. The method of claim 1, wherein processing the encoded paging burst includes at least equalizing the encoded paging burst to produce the plurality of soft symbols.

9. An apparatus comprising:
a radio frequency (RF) front end of a wireless device to receive an encoded paging burst on a paging channel; and
digital processing components coupled to the RF front end to digitally process the encoded paging burst, in which the digital processing components obtain a plurality of soft symbols from the encoded paging burst and compares the plurality of soft symbols to previously stored soft decisions of a null page pattern to determine if the wireless device is to enter a reduced functionality mode.

10. The apparatus of claim 9, wherein the reduced functionality mode is a sleep mode.

11. The apparatus of claim 9, wherein the reduced functionality mode is a sleep mode and if the comparison of the plurality of soft symbols to the previously stored soft decisions results in a threshold certainty, then the wireless device enters the sleep mode without further decoding the soft symbols.

12. The apparatus of claim 9, wherein the reduced functionality mode is a sleep mode and if the comparison of the plurality of soft symbols to the previously stored soft decisions results in a threshold certainty, then the wireless device re-enters the sleep mode without further decoding the soft symbols.

13. The apparatus of claim 9, wherein the RF front end receives an earlier encoded null page paging burst and the digital processing components decode the null page paging burst to identify a null page, obtain soft decisions of the null page and store soft decisions as the null page pattern.

14. The apparatus of claim 9, wherein the RF front end and the digital processing components awaken from an initial sleep mode to receive the encoded paging burst.

15. The apparatus of claim 14, wherein if the comparison of the plurality of soft symbols to the previously stored soft decisions does not result in a threshold certainty, then the wireless device remains in an awake mode to decode the encoded paging burst.

16. The apparatus of claim 9, wherein the digital processing components equalize the encoded paging burst to produce the plurality of soft symbols.

* * * * *